Jan. 21, 1947.   P. THOMAS   2,414,566
POSITION INDICATING APPARATUS
Filed April 5, 1943
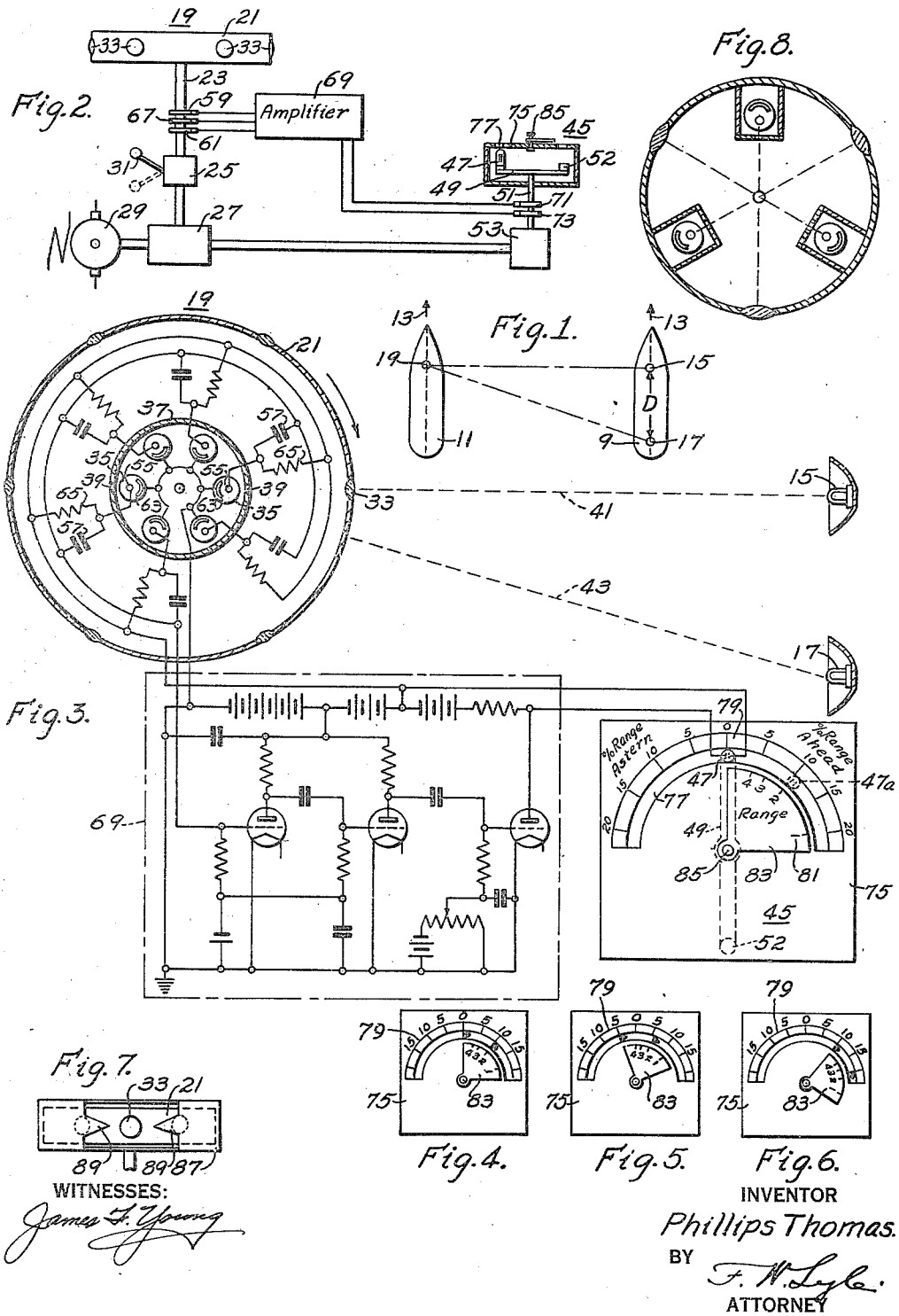
INVENTOR
Phillips Thomas.
BY
F. W. Lyle
ATTORNEY Patented Jan. 21, 1947

2,414,566

UNITED STATES PATENT OFFICE 2,414,566

POSITION INDICATING APPARATUS

Phillips Thomas, Edgewood, Pa., assignor to Westinghouse Electric Corporation, East Pittsburgh, Pa., a corporation of Pennsylvania Application April 5, 1943, Serial No. 481,897

7 Claims. (Cl. 250—11)

This invention relates to position indicating apparatus and has particular relation to apparatus for indicating the relative positions of two objects, either or both of which may be moving or stationary.

Position indicators may be particularly useful in carrying out certain types of naval operations wherein a ship may be assigned a certain position relative to another ship which position is to be maintained throughout a selected period of time. In mine sweeping operations, for example, ships carrying mine sweeping and exploding equipment sail abreast of each other along parallel courses spaced apart a distance of the order of 100 to 400 yards. Should one of the ships get too far in advance of an adjacent ship, it may explode a mine which severely damages the adjacent ship. Should the two ships for any reason get too close together, a portion of the mine field is not cleared. It is, therefore, necessary that apparatus be provided to enable the captain of one ship to determine the position thereof relative to the adjacent ship.

When one ship is visible from the other certain measurements may be readily taken from either ship by means of which the relative positions of the two ships may be determined. However, in providing position indicating apparatus for use in war time, it is highly desirable that the apparatus be operable when one ship may not be visible from the other, as, for example, at night time under blackout conditions. Moreover, the apparatus must not give any readily detectable evidence of its use or presence to outsiders. Consequently, the use of audible sound, visible light or radio waves is not satisfactory.

Another desideratum in position indicating apparatus is an instantaneous and continuous indication. This is particularly important where the allowable variation in position is rather small, as in mine sweeping, for immediate correction is necessary upon any deviation from the assigned position.

It is accordingly an object of my invention to provide novel apparatus for enabling the determination of the relative position of two objects.

Another object of my invention is to provide new and improved apparatus for enabling the determination of the relative positions of two objects, either or both of which may be moving or stationary.

A further object of my invention is to provide novel apparatus giving an instantaneous and continuous indication of the range and bearing of one object relative to another.

A still further object of my invention is to provide novel apparatus for determining the relative positions of two moving objects without giving readily detectable evidence of its use or presence.

More specifically, it is another object of my invention to provide apparatus giving an instantaneous and continuous indication of the relative positions of two moving objects without giving readily detectable evidence of its use or presence.

In accordance with my invention as applied to mine sweeping, one of the ships, which is designated hereinafter as the master ship, has two infrared light sources mounted thereon which are spaced a selected distance from each other along a line parallel to the keel. A reflector may be associated with each light source to establish a conical beam of invisible infrared light extending at approximately right angles to the keel on one side of the master ship.

The second ship, which is hereinafter designated as the slave ship, is to be positioned on the side of the master ship to which the infrared light beams are directed. A scanning device is provided on the slave ship and comprises a rotating wheel-like member having one or more directional energy receiving systems mounted thereon. The wheel-like member is mounted for rotation in a horizontal plane at a point on the slave ship which permits reception of infrared light from both sources on the master ship and which in combination with the forward light source on the master ship preferably forms a line at right angles to the keel when the slave ship is in its assigned position abreast the master ship. The energy receiving systems rotate with the wheel-like member and each system is arranged to receive energy from one of the infrared light sources only during the instant when its axis is directly in line with that one source whereby the receiving system may act as a directional detector.

An indicator is mounted inside the wheelhouse of the slave ship in full view of the helmsman. The indicator includes a glow discharge device or neon lamp carried on a rotating arm for movement in a circular path. The discharge device is electrically connected through an amplifying circuit to each energy receiving system on the rotatable wheel-like member so that a visible glow or light flash occurs in the discharge device each time one of the receiving systems detects one of the infrared light sources on the master ship.

When the wheel-like member of the scanning device is rotated, each receiving system first detects one of the infrared light sources on the master ship and a short time thereafter detects the other source. These successive detections of the receiving systems cause two visible flashes of the glow discharge device spaced along the circular path thereof. The glow discharge device is rotated at a speed having a fixed relation to the speed of the rotating wheel-like member of the scanning device so that the space between the two flashes is a measure of the angle between a line from the scanning device to the first infrared source and a line from the scanning device to the second source. By rotating the glow discharge device at a speed which is $n$ times the speed of the rotating wheel-like member of the scanning device where $n$ is the number of energy receiving systems, the flashes of the glow discharge device resulting from the detection by all of the receiving systems of any one of the infrared light sources, occur at the same position on the circular path of the discharge device. The wheel-like member is preferably rotated at a speed such that the flashes of the glow discharge device corresponding to each individual light source detected appear to the eye as a substantially fixed and continuous light spot. Thus scanning of the two light sources using $n$ directional energy receiving systems produces light flashes appearing as two continuous spots of light at fixed positions on the circular path of the discharge device.

A dial panel may cover the glow discharge device and the arm on which it is mounted with a transparent portion through which the light flashes may be observed. A zero mark may be carried on the dial panel adjacent the path of the discharge device corresponding to the point on the path where a light spot appears when a source is detected at a point at right angles to the keel of the slave ship. By noting the position of the two light spots on the dial panel with reference to the zero mark, the helmsman may instantly determine whether his ship is ahead or astern of the master ship.

Since the space between the two light spots on the dial panel is a measure of the angle between a line from the scanning device to the first source and a line from the scanning device to the second source, it is also a measure of the range or distance between the ships if the angle between the keel line of the master ship and the line from the scanning device to the first source is known. When the two ships are abreast and on their designated parallel courses, this angle is a right angle and a scale may be carried on the dial panel adjacent the path of the discharge device to enable a direct reading of the range. Another scale may also be provided to enable a direct reading of the distance the slave ship is ahead or astern of the master ship.

The novel features that I consider characteristic of my invention are set forth with particularity in the appended claims. The invention, however, both as to its organization and its method of operation together with additional objects and advantages thereof will best be understood from the following description of specific embodiments when read in connection with the accompanying drawing, in which:

Figure 1 is a schematic diagram illustrating the application of my invention to mine sweeping ships, Fig. 2 is a schematic diagram illustrating an embodiment of the scanning and indicating apparatus according to my invention, Fig. 3 is a schematic diagram of the embodiment of Fig. 2 showing the circuit connections employed, Figs. 4, 5, and 6 show the indicator dial panel with different relative positions of the ships, and Figs. 7 and 8 illustrate modifications of the energy receiving systems.

As shown in Fig. 1, a master ship 9 and a slave ship 11 are sailing in the direction indicated by arrows 13 along parallel courses. On the master ship 9 is mounted two infrared light sources 15 and 17 spaced apart a selected distance D along a line parallel to the path of movement of the ship. Scanning apparatus 19 is mounted on the slave ship 11 at a point selected to act with the forward light source 15 on the master ship 9 in forming a right angle with the direction of movement of the two ships.

The scanning apparatus 19 as shown in Figs. 2 and 3 comprises a wheel-like member 21 mounted on a shaft 23 for rotation in a horizontal plane. The shaft 23 is connected through gear boxes 25 and 27 to a motor 29 for rotation thereby. The direction of rotation is determined by the position of a gear shift lever 31 on one of the gear boxes 25. When the master ship 9 is on the starboard of the slave ship 11, the gear shift lever 31 is positioned to effect rotation of the wheel-like member 21 in a clockwise direction. When the master ship is on the port side of the slave ship, the gear shift lever 31 is positioned to effect rotation of the wheel-like member 21 in a counterclockwise direction. Thus in both situations the light sources on the master ship are scanned in order of their location from bow to stern.

The wheel-like member 21 supports six lenses 33 at equally spaced points on the circumference thereof. An equal number of photoelectric tubes 35 are positioned on the wheel-like member 21 near the center thereof with one photoelectric tube corresponding to each lens. A masking ring 37 is positioned between the photoelectric tubes 35 and the lenses 33 and is provided with a narrow slot 39 opposite each photoelectric tube. Because of this arrangement, each photoelectric tube is responsive only to light coming from a source which is on the line extending from the cathode of the photoelectric tube, through the associated slot and the center of the lens. Therefore with two light sources 15 and 17 as shown diagrammatically in Fig. 3 and the wheel-like member 21 rotated in a clockwise direction, it is apparent that each photoelectric tube 35 is momentarily energized first by the light source 15 and then by the second light source 17 a time interval thereafter, the length of which is dependent upon the speed of rotation of the wheel-like member 21 and the angle between a line 41 from the center of the wheel-like member 21 to the first light source 15 and a line 43 from the center to the second light source 17.

An indicating unit 45 is associated with the scanning member 19 and includes a glow discharge device 47 carried on an end of an arm 49 mounted for rotation about its center on a shaft 51 with a counterweight 52 on the other end of the arm. The shaft is connected through another gear box 53 and gear box 27 to the motor 29 to be driven thereby. Each anode 55 of the photoelectric tubes 35 is connected through a corresponding blocking capacitor 57 to a slip ring 59 mounted on the shaft. Each anode 55 is also connected through an individual resistor 65 to a second slip ring 61 on the shaft 23, and each cathode 63 is connected to a third slip ring 67 on the shaft. An amplifier and power supply circuit 69 is then connected between the slip rings 59, 61 and 67 on the shaft 23 and an additional pair of slip rings 71 and 73 on the shaft 51 of the indicator unit 45 to supply power to the glow discharge device 47. The amplifier circuit may be one of several well-known circuits arranged to effect a glow discharge in the discharge device 47 upon detection of a light source by the scanning device 19. Such an amplifier circuit may be arranged to effect the glow discharge in response either to a rapid increase or to a rapid decrease in the energy received by any one of the photoelectric tubes 35. The circuit arrangement illustrated effects a glow discharge upon a rapid decrease in received energy. The rate of increase or decrease in energy as the case might be which is necessary to effect a glow discharge is determined by the dimensions of the various components of the circuit and is selected to prevent a glow discharge in response to changes in general illumination surrounding the apparatus as, for example, the changes caused by the movement of clouds. As will be understood by those familiar with amplifying circuits, the capacitors 57 in circuit with the anodes 55 of the photoelectric tubes 35 are effective to prevent a glow discharge upon a decrease in light on a tube at a rate less than that afforded by movement of the lens and photoelectric tube out of line with one of the infrared light sources 15 or 17. The capacitors 57 and resistors 65 are provided in circuit with the anode 55 of each photoelectric tube 35 so that the photoelectric tube receiving energy from an infrared light source may be effective to cause a glow discharge in the discharge device 47 even though the remainder of the photoelectric tubes are at that moment in a saturated condition because of direct sunlight or strong reflections of sunlight thereon.

Immediately above the glow discharge device 47 is an indicator dial panel 75 having a transparent section 77 opposite the path of the glow discharge device 47. In setting up the apparatus, the wheel-like member 21 is positioned so that a line between one of the photoelectric tubes 35 and the center of its corresponding lens 33 is at right angles to the keel of the ship at the same time that the glow discharge device 47 is at the zero mark on a scale 79 adjacent to the path of the discharge device. It follows that whenever the infrared light source 15 at the bow of the master ship 9 is in position with respect to a photoelectric tube 35 and its corresponding lens 33 to form a right angle with the keel of the master ship 9, the flash of light emitted by the glow discharge device 47 occurs at the zero mark on the indicator panel 75. The panel 75 is illustrated as arranged for clockwise rotation of the discharge device 47. Consequently, the flash of light occurring upon energization of the photoelectric tube by the infrared light source at the stern of the master ship occurs at a point slightly to the right of the zero mark as when the discharge device is at the position indicated at 47a in Fig. 3. The discharge device 47 is rotated about shaft 51 at a speed six times the speed of the wheel-like member 21. Since there are six photo-tubes on the wheel-like member, it follows that the flashes of light resulting from the energization of all of the phototubes by a single light source occur at the same point on the path of the discharge device. The speed of the wheel-like member is then maintained high enough that the flashes of light resulting from the energization of all of the phototubes by a single light source not only occur at the same point on the path of the discharge device but also appear to the eye as a continuous spot of light. Thus, the two infrared light sources on the master ship produce two apparently continuous light spots on the path of the discharge device. These light spots are designated hereinafter as first and second spots corresponding to the first and second light sources 15 and 17, respectively.

Fig. 4 illustrates the position of the light spots on the indicator panel 75 when the slave ship is in its proper position relative to the master ship. By reference to Figs. 1 and 3, it may be understood that the distance between the two spots of light in Fig. 4 is a measure of the angle between the line between the center of the scanning member 19 and the forward light source 15 and the line between the scanning member and the light source 17 toward the stern of the master ship. This angle, in turn, is a measure of the distance between the two ships since the spacing between the two light sources 15 and 17 is known. An additional scale 81 is provided on a movable member 83 positioned adjacent the path of the glow discharge device 47. When the left-hand edge of member 83 is set in line with the leading edge of the first spot of light, the reading on scale 81 opposite the leading edge of the second spot of light gives the range or distance between ships in convenient terms such as hundreds of yards.

If the slave ship should be astern of the master ship, the first spot of light on the indicating panel 75 occurs to the left of the zero mark as illustrated in Fig. 5. The reading on scale 79 opposite the leading edge of the first spot of light gives the distance the slave ship is behind its proper position in a percentage of the range. To obtain the range the member 83 bearing the range scale 81 is adjusted by means of the knob 85 until the left-hand edge thereof corresponds with the leading edge of the first spot of light and the reading of the scale opposite the leading edge of the second spot of light gives the range. Thus, as in Fig. 5, the member 83 bearing the range scale 81 is set in position and the reading taken showing the range to be 200 yards. From the other scale 79, it is determined that the slave ship is 5% of the range or 10 yards astern the master ship. Of course, other calibrations could be used if desired.

Should the slave ship be ahead of the master ship, the first light spot appears on the indicating panel 75 at a point to the right of the zero mark as illustrated in Fig. 6. Again the range may be determined as well as the distance the slave ship is ahead of the master ship.

It may be noted that the range scale 81 is not absolutely accurate with the slave ship either astern or ahead of its proper position. However, in actual practice when the ships are 100 to 400 yards apart, a variation in the position of the ships as high as 20 or 25 yards ahead or astern does not produce a serious inaccuracy in the range reading. It is also to be understood that in actual use the helmsman keeps the indicator constantly in view and if the first light spot moves to the left of the zero mark, he speeds up his ship to bring it into its assigned position, or he slows down the ship if the first light spot appears to the right of the zero mark.

It is also to be noted that the range scale becomes wider as the range becomes smaller. This is definitely advantageous because it is much more important to keep an accurate spacing between ships at 100 yards than at 400 yards. Since the scale is much wider at 100 yards, any deviation in the spacing becomes immediately apparent to the helmsman.

It is to be understood that by using a scanning device having photoelectric tubes and lenses properly positioned the entire apparatus operates satisfactorily even though the master ship be on the opposite side of the slave ship from the position shown in Fig. 1. When the master ship is on the opposite side of the slave ship, the two light spots may be made to appear in the same sequence and in the same quadrant on the indicating panel so that the same scale may be employed by moving lever 31 to reverse the direction of rotation of wheel 21.

In the event that it is desired to prevent energization of any of the photoelectric tubes 35 except when they are within a certain sector, a stationary shield 87 may be placed about the circumference of the wheel-like scanning member 21, as illustrated in Fig. 7. As previously pointed out, the amplifier circuit may be arranged to effect a flash of light in the discharge device in response either to a rapid increase or to a rapid decrease in light on one of the photoelectric tubes but only in response to one change and not to both. The circuit illustrated is responsive only to a rapid decrease in light. To avoid any rapid decrease in the light on a photoelectric tube upon the passage of its corresponding lens 33 from bright daylight to behind the shield 87, the shield may be shaped at the edges of the sector to be scanned, as at 89, so that a lens gradually moves behind the shield. By having both edges so shaped, it is possible to use the same shield when the direction of rotation of the wheel-like member 21 is reversed.

If it is desired to decrease the diameter of the scanning member, an arrangement such as is illustrated diagrammatically in Fig. 8 may be employed. In such an arrangement, however, the number of photoelectric tubes are necessarily reduced which, in turn, requires an increase in the speed of rotation of the device to obtain light flashes at the same frequency and condenses the calibrations of the scales on panel 75. It has been found that the use of six tubes as illustrated in Fig. 3, permitting the speed of rotation of the discharge device 47 to be six times that of the wheel-like member 21, enables the use of easily readable scales in a mine sweeping operation.

Although I have shown and described my invention as applied to mine sweeping operations, I am fully aware that many other applications and modifications thereof are possible. The illustration with respect to mine sweeping is merely intended as an example of a useful application of the invention. My invention, therefore, is not to be restricted except insofar as is necessitated by the prior art and the spirit of the invention.

I claim as my invention:

1. Apparatus for indicating the relative position from a first object of a second object movable along a known course relative to said first object, comprising a pair of sources of radiant energy mounted on said second object, a first rotating member mounted on said first object, a directional energy receiving system mounted on said first rotating member for rotation therewith to receive energy from each of said sources only when directed at that source, said sources being spaced a preselected distance apart along a line having a predetermined relation to said known course so that said receiving system is directed to said sources successively, a second rotating member having a rotational speed which is a multiple of the speed of said first member, a glow discharge device mounted on said second rotating member to be rotated about the center thereof, means interconnecting said energy receiving system and said device for effecting a momentary glow discharge in said device each time energy is received by said system from one of said sources, and scale means positioned adjacent the path of said device enabling both the bearing and range of said second object relative to the first object to be determined from the positions of said device when the glow discharges occur.

2. Apparatus for indicating the relative position from a first object of a second object movable along a known course relative to said first object, comprising a pair of sources of radiant energy mounted on said second object, a first rotating member mounted on said first object, a plurality of directional energy receiving systems mounted on said first rotating member for rotation therewith, each of said systems being arranged to receive energy from each of said sources only when directed at that source, said sources being spaced a preselected distance apart along a line having a predetermined relation to said known course so that each of said receiving systems is directed to said sources successively, a second rotating member having a rotational speed which is equal to $n$ times the speed of said first member, where $n$ is the number of said systems, a glow discharge device mounted on said second rotating member to be rotated about the center thereof, means interconnecting said energy receiving system and said device for effecting a momentary glow discharge in said device each time energy is received by one of said systems from one of said sources, and scale means positioned adjacent the path of said device enabling both the bearing and range of said second object relative to the first object to be determined from the positions of said device when the glow discharges occur, the number of said systems and the speed of rotation of said first member being such that the positions of said device when said glow discharges occur appear as substantially continuous spots of light to an observer.

3. Apparatus for indicating the relative position from a first object of a second object movable along a known course relative to said first object, comprising a pair of sources of radiant energy mounted on said second object, a first rotating member mounted on said first object, a directional energy receiving system mounted on said first rotating member for rotation therewith to receive energy from each of said sources only when directed at that source, said sources being spaced a preselected distance apart along a line having a predetermined relation to said known course so that said receiving system is directed to said sources successively, a second rotating member having a rotational speed which is a multiple of the speed of said first member, a glow discharge device mounted on said second rotating member to be rotated about the center thereof, means interconnecting said energy receiving system and said device for effecting a momentary glow discharge in said device each time energy is received by said system from one of said sources, a first scale adjacent the path of said device enabling the bearing of said second object relative to the first object to be determined by the angular position of said device when the glow discharges occur, and a second scale adjacent the path of said device enabling the range of said second object relative to the first object to be determined by the distance between the two positions of said device when the glow discharges occur corresponding to the two sources of energy.

4. In a scanning apparatus, a directional light receiving system movable along a predetermined path and including a photoelectric device and means for limiting the light on said device substantially to that received from only one direction at any instant, work means responsive only to a decrease in the amount of light on the device at greater than a preselected rate, and a stationary shield mounted adjacent the path of said receiving system with an opening therein extending over a predetermined portion of said path to prevent the reception of light by said system except when the system is within said predetermined path portion, said shield being shaped at the edge of said opening to permit a gradual disappearance of said system behind the shield.

5. In a scanning apparatus, a directional light receiving system movable along a predetermined path and including a photoelectric device and means for limiting the light on said device substantially to that received from only one direction at any instant, work means responsive only to an increase in the amount of light on the device at greater than a preselected rate, and a stationary shield mounted adjacent the path of said receiving system with an opening therein extending over a predetermined portion of said path to prevent the reception of light by said system except when the system is within said predetermined path portion, said shield being shaped at the edge of said opening to permit a gradual emergence of said system behind the shield.

6. Apparatus according to claim 1 for use in a generally illuminated location, wherein the energy sources are light sources and the receiving system includes a photoelectric tube and means for limiting any light on said tube to that received from only one radial direction at any rotary position of said system with the interconnecting means between the receiving system and discharge device being effective only in response to a predetermined change in the amount of light on said device at greater than a preselected rate, said sources being of sufficient power to effect said predetermined change over general illumination, said apparatus also including a stationary light shield surrounding said receiving system and having an opening therein extending over a predetermined angle of rotation of said receiving system whereby light is received by said tube only while said system is directed along a radial path within said angle of rotation, said angle being greater than that necessary to permit reception of light by said system from both sources, the shield being shaped at the edges of the opening to limit the rate of change in the cross-sectional area of a beam of light which may be received by said system through said opening during movement of said system through said predetermined angle, which area change tends to produce said predetermined light change on said tube from general illumination, to a rate such that the rate of change in the amount of light on said device from general illumination is less than said preselected rate.

7. In a scanning apparatus for use in a generally illuminated location, a directional light receiving system including a photoelectric device and means for limiting any light on said device to that received from only one direction at any instant, a shield mounted adjacent the receiving system to prevent the reception of light thereby, means for producing a relative movement between said receiving system and shield, said shield having an opening therein permitting reception of light by said receiving system during a predetermined portion only of said movement, and work means responsive only to a predetermined change in the amount of light on said device at greater than a preselected rate, said shield being shaped at the edges of said opening to limit the rate of change in the cross-sectional area of a beam of light which may be received by said system through said opening during relative movement of said system past said edges, which area change tends to produce said predetermined change in the amount of light on said device from general illumination, to a rate such that the rate of change in the amount of light on said device from general illumination is less than said preselected rate.

PHILLIPS THOMAS.